United States Patent
Kopp et al.

(10) Patent No.: US 10,062,935 B2
(45) Date of Patent: Aug. 28, 2018

(54) COOLING PLATE FOR AN ELECTRICAL ENERGY STORAGE ELEMENT

(71) Applicant: Robert Bosch GmbH, Stuttgart (DE)

(72) Inventors: Benjamin Kopp, Remseck Am Neckar (DE); Steffen Benz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/514,921

(22) PCT Filed: Aug. 5, 2015

(86) PCT No.: PCT/EP2015/068081
§ 371 (c)(1),
(2) Date: Mar. 28, 2017

(87) PCT Pub. No.: WO2016/050395
PCT Pub. Date: Apr. 7, 2016

(65) Prior Publication Data
US 2017/0263987 A1    Sep. 14, 2017

(30) Foreign Application Priority Data
Sep. 30, 2014   (DE) .......... 10 2014 219 812

(51) Int. Cl.
*F28F 7/00* (2006.01)
*H01M 10/6555* (2014.01)
(Continued)

(52) U.S. Cl.
CPC .......... *H01M 10/6555* (2015.04); *F28F 3/14* (2013.01); *H01M 8/0267* (2013.01);
(Continued)

(58) Field of Classification Search
CPC .......... H01M 10/6555; H01M 10/613; H01M 10/625; H01M 10/6556; H01M 8/0267;
(Continued)

(56) References Cited

U.S. PATENT DOCUMENTS 2,759,247 A * 8/1956 Grenell ................ B21D 53/045
165/129
2,896,312 A * 7/1959 Schell .................. B21D 53/045
29/407.01

(Continued)

FOREIGN PATENT DOCUMENTS

AT        377076       2/1985
CN    201429362 Y    3/2010
(Continued)

OTHER PUBLICATIONS

International Search Report for Application No. PCT/EP2015/068081 dated Oct. 28, 2015 (English Translation, 3 pages).

*Primary Examiner* — Justin Jonaitis
(74) *Attorney, Agent, or Firm* — Michael Best & Friedrich LLP

(57) ABSTRACT

The invention relates to a cooling plate for an electric energy storage element, said cooling plate comprising at least two non-detachably interconnected metal sheets and at least one plastic covering. The joined metal sheets comprise at least one cooling channel which can be created by separating means.

6 Claims, 2 Drawing Sheets

(51) Int. Cl.
  *H01M 8/0267* (2016.01)
  *H01M 8/04029* (2016.01)
  *H01M 10/625* (2014.01)
  *H01M 10/647* (2014.01)
  *H01M 10/6568* (2014.01)
  *H01M 10/6567* (2014.01)
  *H01M 10/6554* (2014.01)
  *H01M 10/613* (2014.01)
  *H01M 10/6556* (2014.01)
  *F28F 3/14* (2006.01)
  *H01M 10/0525* (2010.01)
  *H01M 12/08* (2006.01)
  *H01M 10/658* (2014.01)

(52) U.S. Cl.
  CPC ... *H01M 8/04029* (2013.01); *H01M 10/0525* (2013.01); *H01M 10/613* (2015.04); *H01M 10/625* (2015.04); *H01M 10/647* (2015.04); *H01M 10/6554* (2015.04); *H01M 10/6556* (2015.04); *H01M 10/6567* (2015.04); *H01M 10/6568* (2015.04); *H01M 12/08* (2013.01); *H01M 10/658* (2015.04); *H01M 2220/20* (2013.01); *H01M 2250/20* (2013.01); *H05K 999/99* (2013.01); *Y02T 90/32* (2013.01)

(58) Field of Classification Search
  CPC ......... H01M 8/04029; H01M 10/0525; H01M 12/08; H01M 2220/20; F28F 3/14; F28F 3/12; F28F 3/00; F28F 1/10; F28D 2021/0028; F28D 2021/0029; F28D 1/0308; F28D 1/0366; F28D 9/0031; F28D 9/0062; F28D 15/04; H01L 23/40; H01L 23/46; H01L 23/473; H01L 23/4735

USPC ............ 165/80.4, 170; 29/890.043, 890.044, 29/890.045
See application file for complete search history.

(56) References Cited

U.S. PATENT DOCUMENTS

| | | | | | |
|---|---|---|---|---|---|
| 2,906,006 | A | * | 9/1959 | Neel | B21D 51/00 29/890.041 |
| 3,031,735 | A | * | 5/1962 | Jepson | A47J 37/105 219/438 |
| 4,412,373 | A | * | 11/1983 | Kosonen | B21D 53/045 29/421.1 |
| 5,381,510 | A | * | 1/1995 | Ford | A61M 5/44 165/169 |
| 5,800,942 | A | * | 9/1998 | Hamada | B60K 1/04 429/120 |
| 8,835,038 | B2 | * | 9/2014 | Abels | H01M 2/1077 429/120 |
| 2010/0288380 | A1 | | 11/2010 | Sicre et al. | |

FOREIGN PATENT DOCUMENTS

| | | |
|---|---|---|
| CN | 102623771 A | 8/2012 |
| DE | 1752852 | 11/1971 |
| DE | 102007056995 | 5/2009 |
| DE | 102010025656 | 1/2012 |
| DE | 102012216951 | 3/2014 |
| DE | 102013021651 | 7/2014 |
| JP | S55114432 A | 9/1980 |
| JP | H07305929 A | 11/1995 |
| JP | 2006244756 A | 9/2006 |
| JP | 2012195313 A | 10/2012 |
| JP | 2014513382 A | 5/2014 |
| WO | 2012120090 | 9/2012 |

* cited by examiner

COOLING PLATE FOR AN ELECTRICAL ENERGY STORAGE ELEMENT

BACKGROUND OF THE INVENTION

The invention relates to a cooling plate for an electrical energy storage element.

DE 102010025656 A1 discloses by way of example a modular device for supplying voltage to a motor vehicle, wherein a cooling plate in the form of a cooling element is used for cooling the electrochemical storage cells. The cooling element is produced by way of example by means of roll bonding or extrusion molding, wherein a pipe run is introduced by means of lasers or flat pipes. An insulating layer is provided on the floor of the housing in order not to impair the cooling efficiency.

It is a disadvantage of the known prior art that a thermal insulation is used exclusively between the electrochemical storage cells and the cooling plate and the cooling plate does not comprise a separate casing.

SUMMARY OF THE INVENTION

In contrast, the method in accordance with the invention has the advantage that a cooling plate for an electrical energy storage device comprises at least two metal sheets that are connected to one another in a non-detachable manner, and at least one synthetic material cover, wherein the connected metal sheets comprise at least one cooling channel that is inflated by means of a separating agent, whereby the mechanical stability is improved.

An additional sealing arrangement is provided by means of the synthetic material cover and, as a consequence, a greater degree of tightness is achieved, whereby a likelihood of leakage occurring is reduced in an advantageous manner in contrast to the prior art.

Aluminum, aluminum alloys, copper and/or gold are used as materials for the metal sheets, whereby a planar contact surface between the cooling plate and by way of example an electrical energy storage device, and/or a high degree of thermal conductivity is achieved in an advantageous manner.

In an advantageous manner, the synthetic material cover is an electrical insulator, whereby an electrical insulation of the cooling plate is achieved with respect to an adjacent electrical energy storage element so that, by way of example in the event of a malfunction, electrical current does not flow from an energy storage device by way of the cooling plate and cooling pipes to a cooling system and a person is not injured by an electric shock.

The method for producing a cooling plate in accordance with the invention comprises the following steps:

In a first method step, a separating agent is applied to at least one first area of a first metal sheet, whereby by way of example a cooling channel structure is provided. Fine cooling channel structures can be produced in an advantageous manner by means of a selected method for applying the separating agent, by way of example by means of a printing process, wherein said fine cooling channel structures comprise a high degree of tightness in contrast to pipe lines in accordance with the prior art and/or render it possible to change or adjust the cooling channel structure in a simple manner.

In a second method step, a mechanically non-detachable connection is produced between second areas of the first metal sheets and at least one second metal sheet, wherein the first areas are omitted by means of the separating agent from the mechanically non-detachable connection, whereby the process of introducing channels, by way of example by means of lasers, is omitted in an advantageous manner.

In a third method step, at least one cooling channel is formed by means of inflating the first area so that a cooling agent for absorbing the heat can flow along the cooling channel. In dependence upon a pressure used for and/or the duration of the single-sided or two-sided inflation of the first area, a larger cross-section of the cooling channel is achieved, whereby in an advantageous manner pressure losses are reduced and/or a larger contact surface is achieved with the same weight.

In a fourth method step, a synthetic material cover is mechanically fixed to at least one surface of the connected metal sheets, said surface being remote from the mechanically non-detachable connection, whereby advantageously an improved mechanical stability is achieved and a high degree of tightness is achieved in the case of fixing synthetic material covers on all sides of the metal sheets that are connected to one another in a mechanically non-detachable manner.

The mechanically non-detachable connection between the at least two metal sheets is produced by means of a roll bonding method and/or an adhesive method. In the case of the roll bonding method, the metal sheets are joined by means of rolling under high pressure. In a further embodiment, a metal sheet is built up from various materials prior to being rolled with an additional metal sheet. A uniform mechanically non-detachable connection is produced by means of the roll bonding method, whereby the mechanical stability is increased and the weight is reduced, since thinner metal sheets are used.

The separating agent is printed onto the metal sheet, whereby in an advantageous manner fine cooling channel structures are produced, said fine cooling structures comprising a high degree of tightness in contrast to pipelines and/or rendering it possible to make simple changes to the cooling channel structure. By way of example, graphite, oil, wax, silicone and/or fat is used as the separating agent.

In order to inflate the first area, pressurized air is applied in an advantageous manner, wherein by way of example a diameter of the cooling channel is varied depending on the duration of the inflation procedure and/or the pressure used. By way of example, two different cooling channel structures having different diameters are produced within a cooling plate.

The synthetic material cover is fixed by means of clips, ultrasonic welding, adhesive bonding and/or screws to the at least one surface of the connected metal sheets, said surface being remote from the mechanically non-detachable connection.

Where reversible mechanical connections are required, by way of example for the purpose of exchanging the metal sheets and/or synthetic material covers, for servicing purposes, the synthetic material cover is fixed by means of clips and/or screws. Said synthetic material covering is fixed on the edges of the metal plates that are connected to one another in a mechanically non-detachable manner.

If the cooling plate is to be protected against manipulation, then the synthetic material cover is fixed by means of welding, by way of example ultrasonic welding and/or adhesive bonding on the edges and/or on one surface of the connected metal sheets, said surface being remote from the mechanically non-detachable connection.

The cooling plate in accordance with the invention is mechanically connected in an advantageous manner to an electrical energy storage element, by way of example a battery cell, a battery module and/or a Supercap, by way of example by means of screws, adhesive bonding, clamps, clips and a cooling agent flows through the cooling plate along the at least one cooling channel.

The cooling plate in accordance with the invention is used in an advantageous manner in a vehicle having at least one electrical energy storage element, by way of example a lithium ion battery, a lithium sulfur battery, a lithium air battery.

DETAILED DESCRIPTION

Figure 1A:
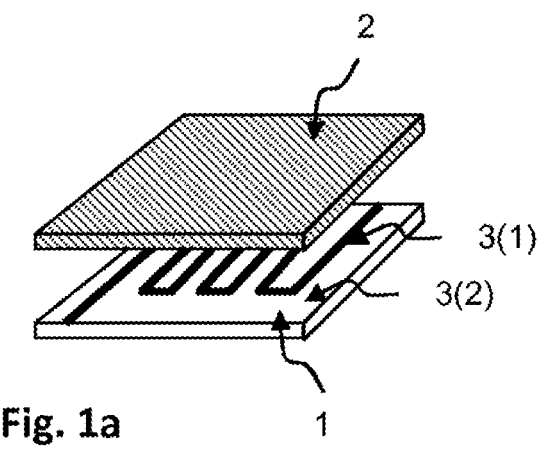
FIG. 1a illustrates a first method step for producing the cooling plate in accordance with the invention.

Like reference numerals describe like device components in all figures.

FIG. 1a illustrates a first metal sheet 1 and a second metal sheet 2, wherein a separating agent is applied to at least a first area 3(1) of the first metal sheet 1 and a second area 3(2) of the first metal sheet 1 does not receive any separating agent. The separating agent is applied to the first metal sheet 1 in a first method step, by way of example by means of a printing process.

Figure 1B:
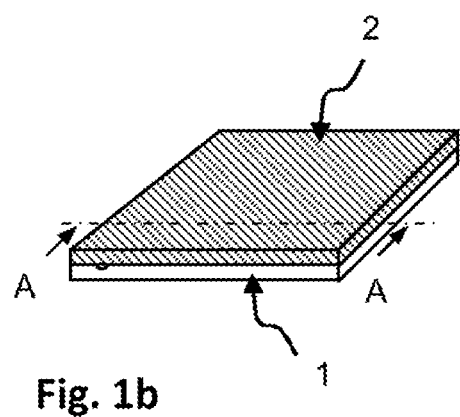
FIG. 1b illustrates a second method step for producing the cooling plate in accordance with the invention.

In FIG. 1b, the first metal sheet 1 and the second metal sheet 2 are connected to one another in a mechanically non-detachable manner, by way of example the connection is established in a second method step by means of roll bonding.

Figure 1C:
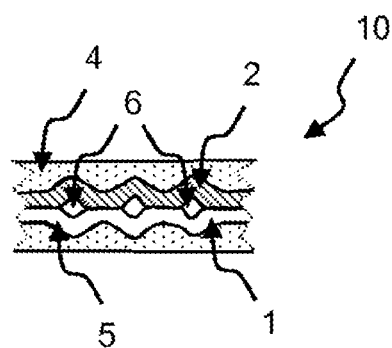
FIG. 1c illustrates a sectional view through one embodiment of the cooling plate in accordance with the invention implementation of a third and a fourth method step.

FIG. 1c illustrates a sectional view along the plane A-A, indicated in FIG. 1b, of a finished cooling plate 10, wherein at least one cooling channel 6 is formed in a third method step by means of inflating the first area 3(1) that is lying within the mechanically non-detachable connection of the first metal sheet 1 and the second metal sheet 2 and in a fourth method step synthetic material covers 4, 5 are fixed on the surfaces that are remote from the mechanically non-detachable connection.

Figure 2:
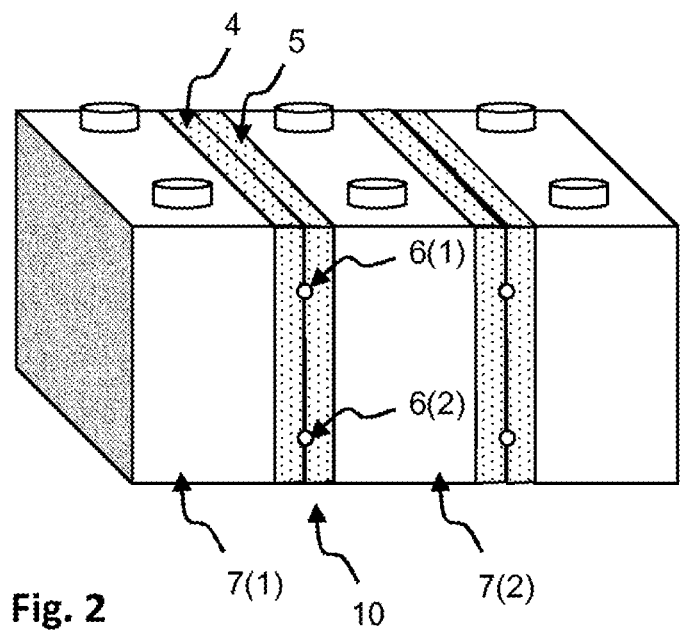
FIG. 2 illustrates a first possible use of the cooling plate in accordance with the invention.

FIG. 2 illustrates a first possible use of the cooling plate 10 in accordance with the invention, said cooling plate being arranged spatially between two energy storage elements 7(1), 7(2), by way of example battery cells or battery modules. Synthetic material covers 4, 5 that form a synthetic material casing around the metal sheets 1,2 are fixed on the surfaces that are remote from the mechanically non-detachable connection. The cooling plate 10 is connected to a cooling circuit by means of two cooling channels 6(1), 6(2).

Figure 3:
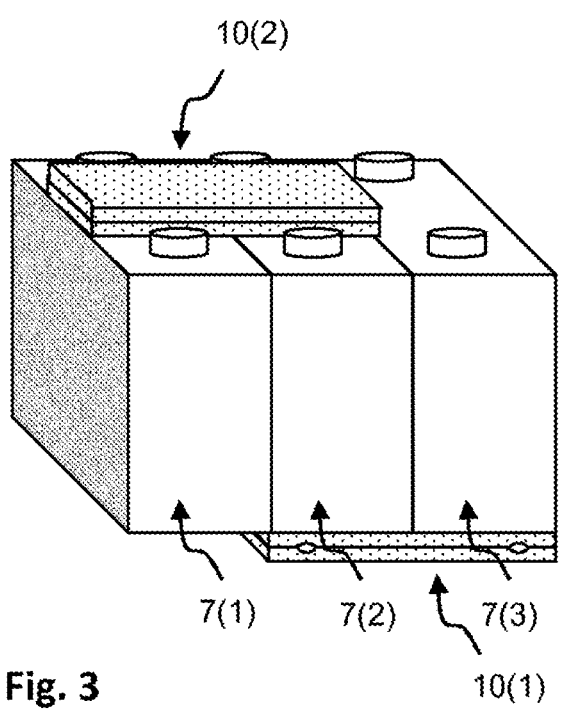
FIG. 3 illustrates a second and third possible use of the cooling plate in accordance with the invention.

FIG. 3 illustrates a second use of the cooling plate 10(2) in accordance with the invention, said cooling plate being arranged spatially on an upper surface, by way of example between the connection poles of battery cells, of electrical energy storage elements 7(1), 7(2), 7(3).

A third use of the cooling plate 10(1) in accordance with the invention is illustrated in FIG. 3, said cooling plate being arranged spatially on the lower surface, by way of example as a base plate of the battery cells, of the electrical energy storage elements 7(1), 7(2), 7(3).

In a further possible use, the cooling plate is arranged within a housing of the electrical energy storage elements 7(1), 7(2), 7(3). As a result of the electrically insulating synthetic material and the high degree of tightness, the cooling plate in accordance with the invention can be arranged, by way of example, within a battery cell housing.

What is claimed is:

1. A method for producing a cooling plate for an electrical energy storage element, the cooling plate comprising at least two metal sheets that are connected to one another in a non-detachable manner, and the cooling plate also comprising at least one synthetic material cover, wherein the connected metal sheets comprise at least one cooling channel that is inflated by means of a separating agent, said method comprising the following steps:

applying a separating agent to at least a first area of a first one of the two metal sheets, producing a mechanically non-detachable connection between second areas of the first metal sheet and a second one of the two metal sheets by means of roll bonding, forming the at least one cooling channel by means of inflating the first area, and fixing the synthetic material cover to at least one surface of the connected metal sheets, said surface being remote from the mechanically non-detachable connection.

2. The method for producing a cooling plate as claimed in claim 1, characterized in that the separating agent is printed onto the metal sheet.

3. The method for producing a cooling plate as claimed in claim 1, characterized in that pressurized air is used for inflating the first area.

4. The method for producing a cooling plate as claimed in claim 1, characterized in that the synthetic material cover is fixed to the at least one surface of the connected metal sheets by means of clips, ultrasonic welding, adhesive bonding and/or screws.

5. The method for producing a cooling plate as claimed in claim 1, wherein the synthetic material cover is an electrical insulator such that fixing the synthetic material cover to at least one surface of the connected metal sheets includes fixing the electrical insulator to at least one surface of the connected metal sheets.

6. A method for producing a system having an electrical energy storage element and a cooling plate, the cooling plate comprising at least two metal sheets that are connected to one another in a non-detachable manner, and the cooling plate also comprising at least one synthetic material cover, wherein the connected metal sheets comprise at least one cooling channel that is inflated by means of a separating agent, said method comprising the following steps:

applying a separating agent to at least a first area of a first one of the two metal sheets, producing a mechanically non-detachable connection between second areas of the first metal sheet and a second one of the two metal sheets by means of roll bonding, forming the at least one cooling channel by means of inflating the first area, fixing the synthetic material cover to at least one surface of the connected metal sheets, said surface being remote from the mechanically non-detachable connection, mechanically connecting the cooling plate to the electrical energy storage element; and cooling the electrical energy storage element by providing a cooling agent through the at least one cooling channel of the cooling plate.

\* \* \* \* \*